US007519907B2

(12) United States Patent
Cohen et al.

(10) Patent No.: US 7,519,907 B2
(45) Date of Patent: Apr. 14, 2009

(54) SYSTEM AND METHOD FOR IMAGE EDITING USING AN IMAGE STACK

(75) Inventors: Michael Cohen, Seattle, WA (US); R. Alex Colburn, Renton, WA (US); Steven M. Drucker, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 819 days.

(21) Appl. No.: 10/633,776

(22) Filed: Aug. 4, 2003

(65) Prior Publication Data

US 2005/0030315 A1 Feb. 10, 2005

(51) Int. Cl.
*G06F 3/00* (2006.01)
(52) U.S. Cl. .................................. 715/723; 715/728
(58) Field of Classification Search .......... 715/538, 715/418, 719–732
See application file for complete search history.

(56) References Cited

U.S. PATENT DOCUMENTS

| | | | | | |
|---|---|---|---|---|---|
| 5,493,419 | A | * | 2/1996 | Jodoin et al. | 358/3.08 |
| 5,754,618 | A | * | 5/1998 | Okamoto et al. | 378/4 |
| 5,990,901 | A | * | 11/1999 | Lawton et al. | 345/581 |
| 6,078,701 | A | * | 6/2000 | Hsu et al. | 382/294 |
| 6,130,676 | A | * | 10/2000 | Wise et al. | 345/619 |
| 6,389,155 | B2 | * | 5/2002 | Funayama et al. | 382/118 |
| 7,027,054 | B1 | * | 4/2006 | Cheiky et al. | 345/473 |
| 7,038,810 | B1 | * | 5/2006 | Yamazoe et al. | 358/1.9 |
| 2003/0190090 | A1 | * | 10/2003 | Beeman et al. | 382/284 |
| 2003/0210407 | A1 | * | 11/2003 | Xu | 356/611 |
| 2004/0044732 | A1 | * | 3/2004 | Fushiki et al. | 709/205 |

OTHER PUBLICATIONS

Dayton et al., "The Photoshop 3 Wow! Book," 1996, Peachpit Press, Windows Edition , 35, 54, 55, 76, 83, 116, 136, 139-141.*
Cuang, Y., Agarwala, A., Curless, B., Salisin, D. Szeliski, R. , "*Video Matting of Complex Scenes*", SIGGRAPH 2002.
Paul Debevec, Jitendra Malik, *Recovering High DynamicRange Radiance Maps from Photographs*, SIGGRAPH 1997.
Frédo Durand and Julie Dorsey, Fast Bilateral Filtering for the Display of High-Dynamic-Range Images, SIGGRAPH 2002.
Jan Koenderink and Sylvia Pont, *Texture at the Terminator*. 2002.
M. Massey and W. Bender., Salient Sills: Process and Practice, IBM Systems Journal, vol. 35, Nos. 3 and 4. 1996.
Nayer, S, Mitsunaga, T., *High Dynamic Range Imaging: Spatially Varying Pixel Exposures*, Proceedings of IEEE Conference on Computer Vision and Pattern Recognition, Jun. 2000.
Erik Reinhard, Michael Stark, Peter Shirley, James Ferwerda, *Photographic Tone Reproduction for Digital Images*, SIGGRAPH 2002.

* cited by examiner

*Primary Examiner*—Ba Huynh
*Assistant Examiner*—Shashi K Becker
(74) *Attorney, Agent, or Firm*—Lyon & Harr, LLP; Katrina A. Lyon (57) ABSTRACT

A system and method for editing images. A simple but powerful image stack is employed in creating an enhanced image from a stack of registered images. This paradigm combines pixels using multi-image operations on the image stack. Image Stacks can help create group photographs, create high dynamic range images, combine images captured under different lighting conditions, remove unwanted objects from images, and combine images captured at different times and with different focal lengths.

36 Claims, 10 Drawing Sheets
(9 of 10 Drawing Sheet(s) Filed in Color)

SYSTEM AND METHOD FOR IMAGE EDITING USING AN IMAGE STACK

BACKGROUND

1. Technical Field

This invention is directed toward a system and process for digital image processing. More particularly, the invention is directed toward an efficient method for editing multiple images to create a composite image.

2. Background Art

Digital cameras are becoming popular and their sales have increased rapidly in recent years. Since digital cameras have become so popular, there has been an increased desire to share the photos taken with these cameras between family members, friends and coworkers. Business use of these images has also increased dramatically. Digital images are frequently used in marketing materials, technical papers, reports and Internet websites.

An aspect of digital image sharing is the quality of the images shared and used in various applications. People often seek to improve images themselves or collaboratively with others. Image-editing software, that improves the quality of digital images, has therefore also become quite popular. In a traditional darkroom, image quality is controlled with choices of films, chemicals, papers and processes. In the digital equivalent of the darkroom, images are edited with a computer system and a photo-editing program. Just as in a traditional darkroom, the quality of the digital tools has an impact on the quality of the images achieved. Digital images can be edited in a wide variety of ways using photo-editing software. In some cases an editing program is used to improve an image by eliminating or reducing its flaws. For example, some conventional photo-editing operations that improve a digital image include: cropping, adjusting brightness and contrast, correcting color balance, adjusting color saturation, filtering, converting color images to black and white, hand coloring black and white photos, eliminating red eye, and resizing an image to different resolutions.

Other methods of editing digital images include creating special effects such as, for example, using multiple or timed exposures, overlaying images of different subject matter, adding color to or tinting black and white images, creating a vignette (soft fade) effect, and so on.

One important aspect of digital photography is capturing images of a group of people, such as, for example, a family photo or an image of a sports team. Taking group photographs can be frustrating because capturing a single image in which everyone is smiling and has their eyes open is nearly impossible. Most photographers take a series of photographs hoping to capture at least one satisfactory image of the group. However, this approach may never yield such an image. On the other hand, within the series of images, it is likely that at least one good image of each individual within the group will be captured. To resolve such a problem, it would be ideal to create a group photograph by combining the best portions of a series of individual images into a single composite image that incorporates the best view of each person in the group.

SUMMARY

The present invention is directed toward a system and process that overcomes the aforementioned limitations in systems for creating digital images by a system and method that employs an "image stack" in easily combining individual images into an enhanced composite image.

An image stack is a set of identically sized registered images (e.g., the same pixel in each image represents more or less the same thing) that may originate from any stationary still or video camera. One way to envision an image stack is as a three dimensional (3D) collection of pixels defined by a set of images (or a short video). In the 3D pixel set, the normal X and Y dimensions define the coordinates of a single image. The Z (or time) dimension defines which image in the stack (or what point in time in a video). A span of pixels is the set of all pixels at some (X,Y) location in all images of the image stack.

The easiest way to assure the images are registered is to use a tripod to capture the images or video. If a stationary camera was not used to capture a set of images, the images may be registered by manually aligning them by conventional methods or using an automated registration procedure.

Filters may be applied to the 3D image stack, or a portion thereof, to create one or more new 2D intermediate images. A filter is a function that operates on the 3D image stack to create a 2D image. An intermediate image is one created by running a filter on the image stack.

Various filters can be used to create different effects. For example, a slice filter, median filter, Maximum Histogram/Minimum Histogram filter, Maximum Luminance (Y) filter, Maximum Contrast filter, Temporal Sharpen/Smooth filter, Mat filter, High Dynamic Range filter, or Surface filter can be used. It should be noted that any standard filtering technique that can be applied to, or produce, one or more 2D images can be used in conjunction with the system and method according to the invention.

The Slice(x,y,z) filter extracts a slice or image at depth z from the image stack. More specifically, for each (x,y) it returns the pixel at depth z.

The Median(x,y) filter returns $I(x,y,z)$ where z is the depth with the median luminance along the span at (x,y). This filter is useful for removing objects found in only one or a few images. It can also help in removing temporal noise from a dark video sequence.

The MaximumHistogram filter returns the pixel with the minimum sum of squared distances in red, green, blue (RGB) color space to all other pixels in the span, while the Minimum Histogram filter does just the opposite of the MaximumHistogram filter by returning the pixel furthest from all others. These filters deliver the most/least common objects in the scene.

The Maximum Luminance filter, MaxY(x,y), simply returns the pixel in the span at (x,y) with the maximum luminance, Y. Similarly, the MaxContrast(x,y) filter returns the pixel in the span at (x,y) that has the highest contrast in a small (e.g., 5×5 pixel) neighborhood around it. This filter has proven useful when combining images under different light conditions or taken at multiple focal lengths.

The TemporalSmooth/Sharpen(x,y,z,dz) filter returns, as its name implies, a low/high pass filtered version of the image stack. Parameters for this filter include z and dz, the center and width of the filter along the span.

The HighDynamicRange(x,y,map(R→Y)) filter assumes the input stack has images with different exposures and exposure information. This filter computes a radiance value for each pixel and then tone maps the radiance back to the gamut of the monitor (e.g., 0 to 255) via a user defined tone map (automatic tone mapping can also be used). The map can be adjusted in real time as the user observes the resulting intermediate image.

The Surface(x,y,z(x,y)) filter returns the pixel $I(x,y,z(x,y))$ where $z(x,y)$ defines a surface through the image stack volume. Two surface design tools have been implemented in one working embodiment of the invention. One surface design tool creates a planar slice by adjusting rotations about the x and y axes and translating in z. The other produces a swept surface by defining a curve z(x) for all values of y.

The Mat(C1(x,y),C2(x,y), α(|C1(x,y)−C2(x,y)|)) filter takes two images and a matting function as input and produces a mat of the first image, C1, with its alpha channel modified. The Mat filter is particularly useful for adding specific temporal events to the final composite image without erasing earlier edits. The median image typically provides the comparison image, C2. A simple approach to define a mapping from the color difference between C1 and C2 to a transparency or blending coefficient, alpha, is provided in the system and method according to the invention in which the user adjusts two parameters, an absolute difference and a smoothing factor defining a smoothed step function. This allows the user to easily define how different a region has to be from the median to be composited into the final image.

A user can select at least one source image, either one of the original images in the image stack or an intermediate image, from which pixel values may be composited (or painted) to a new resultant image. The final composite image is created by overlaying some or all of the pixels from the source (either an image from the stack or an intermediate image) to the composite image. The set of pixels to be overlaid can be transferred either by overlaying all of them or by painting a portion of them. The user may successively select as many source images as desired to create the final composite image. For example, the user can select the best face for each person in a series of group photos to create a composite group photograph of the best facial expression for each person.

The User Interface (UI) of one exemplary embodiment of the invention is designed to easily compute operations on the image stack. This UI allows a user to set the parameters of the filters and the parameters of the brushes used to create the composite drawing. The user interface includes a set of sliders that allow a user to set the parameters necessary to fully define the filters. Other sliders allow the user to set the parameters of the "brush" used to composite pixels from the source to the composite image. The display also includes a pane that displays the source image from the image stack, which is being used to create the composite image. Additionally, the composite image is displayed. A high dynamic range mapping window, that is used in tone mapping for the high dynamic range filter, is also shown.

In addition to improving group photographs, the system and method according to the invention employing one or more image stacks may be used for a variety of applications such as, for example, creating high dynamic range images, combining images captured under different lighting conditions, removing objects from images, and combining images captured at multiple points in time or with different focal lengths.

It is noted that in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
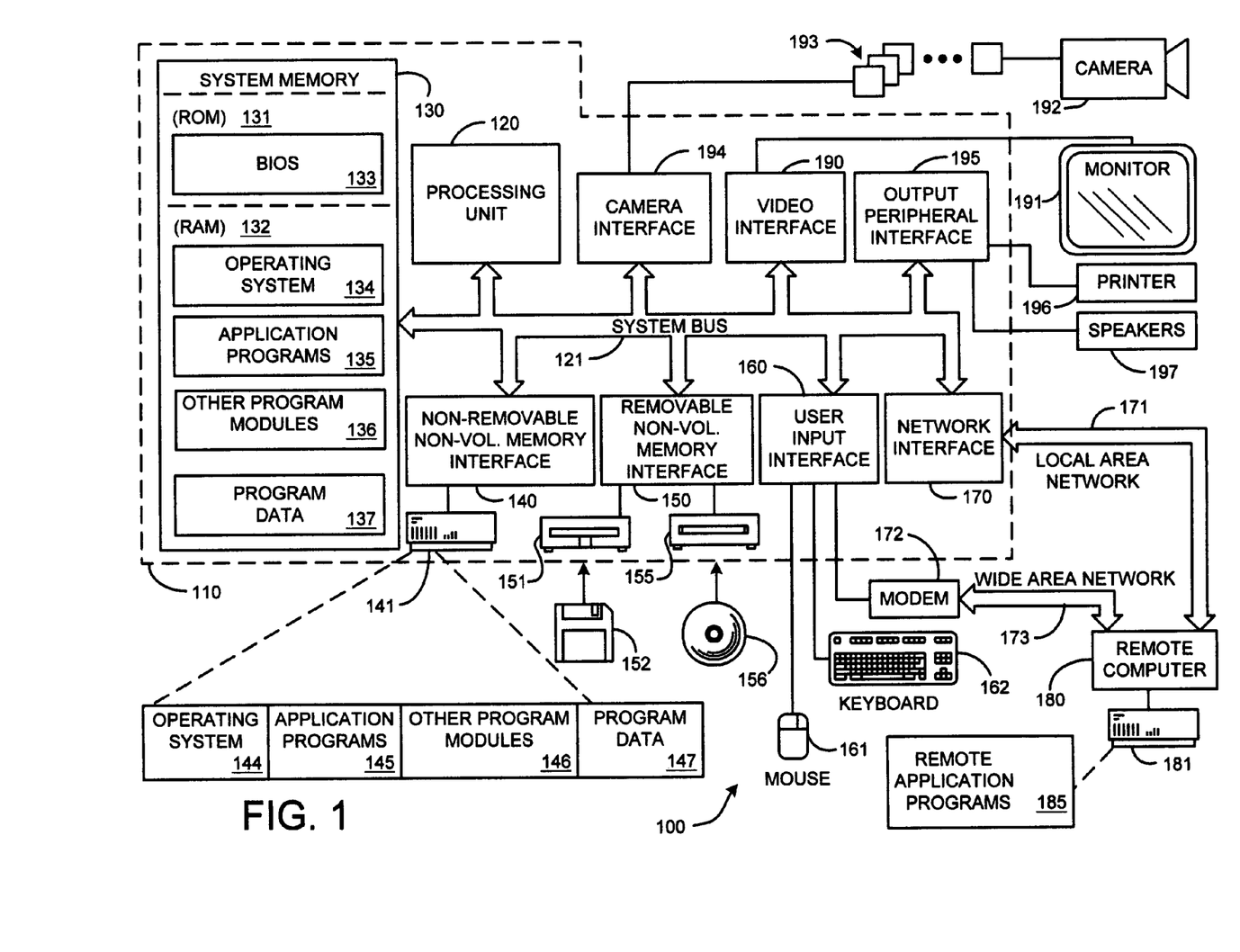
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes volatile and nonvolatile removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The aforementioned term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 System and Method for Image Editing Using an Image Stack.

In this section, the system and method of image editing according to the invention is described.

2.1 Overview.

Figure 2:
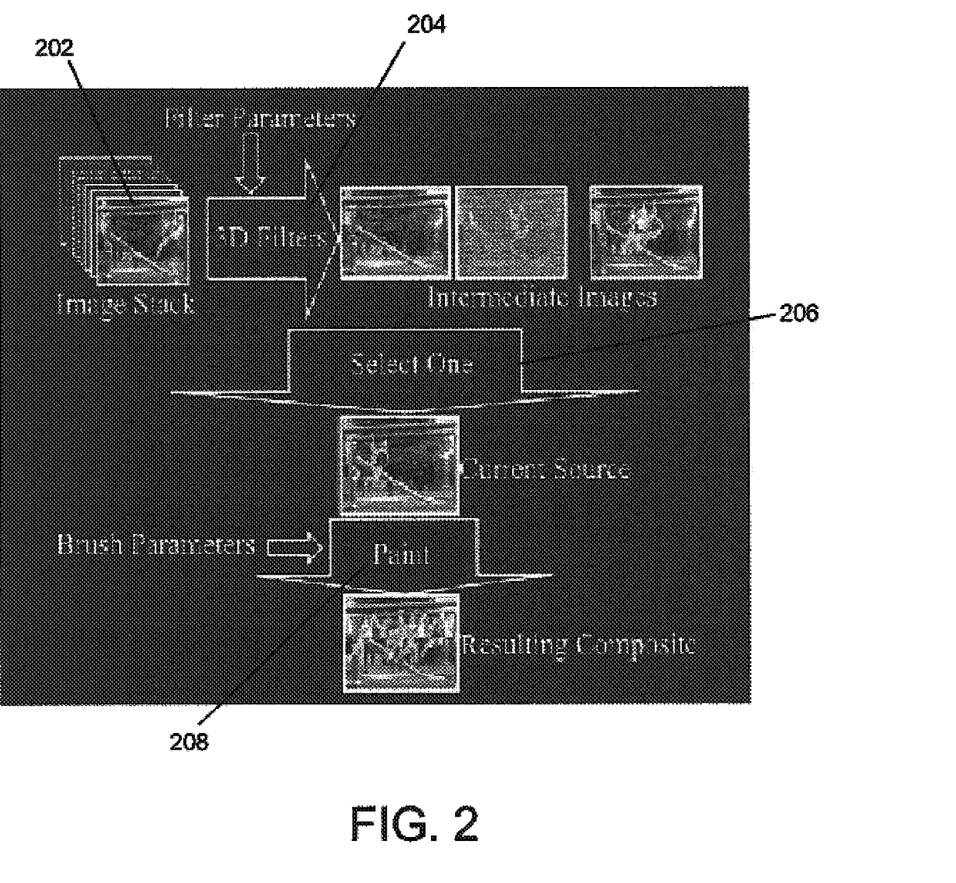
FIG. 2 is a flow diagram depicting the general process actions of creating a composite image employing the system and method according to the invention.

FIG. 2 provides a general flow diagram of the image editing system and method according to the invention. An image stack is input into the system, as shown in process action 202. A user applies one or more filters to the image stack to create one or more new images referred to as intermediate images, as shown in process action 204. A user can then select one of the original images or an intermediate image to serve as a source image (process action 206) from which pixels may be composited or painted into a new resultant image (process action 208). A painting paradigm may be used to select which pixels from the source image are added and how these pixels are painted into the resultant image. The user may successively select as many source images as desired to create the final composite image.

The various aspects of these process components will be discussed in more detail below.

2.2 The Image Stack.

An image stack is a set of identically sized registered images that may originate from any stationary still or video camera. The images in the image stack typically vary in one or more of the time they were taken, the lighting direction and amount, focus, exposure and/or camera position. Additionally, sometimes the images in the image stack are of different subject matter and may contain different meta data (such as exposure). If a stationary camera was not used to capture a set of images, the images may be registered by conventional techniques such as by manually aligning them or using an automated registration procedure. The image stack may be thought of as a 3D cube-like set of pixels $I(x,y,z)$. For example, one way to envision an image stack is as a three dimensional (3D) collection of pixels defined by a set of images (or a short video). In the 3D pixel set, the normal X and Y dimensions define the coordinates of a single image. The Z (or time) dimension defines which image in the stack (or what point in time in a video). For example, position (78,259,7) would be the pixel at position (78,259) in the $7^{th}$ frame or image (or slice) in the stack. At each (x,y), one may refer to a span of pixels over all values of z. A span of pixels is the set of all pixels at some (X,Y) location in all images of the image stack (e.g., pixel (47,83) in all images in the image stack for the example given above). Filters often operate on each span of pixels. The pixels can also be described in terms of their color (e.g., RGB) and their transparency, alpha ($\alpha$).

2.3 3D Filters.

Filters are functions capable of mapping from a 3D volume to a 2D image. Filters may be applied to the 3D image stack to create new 2D intermediate images. An intermediate image is one created by running a filter on the image stack. A variety of 3D filters can be used with any given image stack to create an intermediate image. The following paragraphs describe some of these filters available in one embodiment of the invention. Some of the following filters can be individually applied to the image stack, while others filters can be applied to the image stack in combination.

Slice Filter: The Slice(x,y,z) filter extracts a slice or image at depth z from the image stack. More specifically, for each (x,y) it returns the pixel at depth z.

Median Filter: In general, the Median filter delivers for each pixel location, the pixel in the corresponding span with the median luminance value. More specifically, the Median (x,y) filter returns $I(x,y,z)$ where z is the depth with the median luminance along the span at (x,y). This filter is useful for removing objects found in only one or a few images, for removing temporal events such as something that moves across the image in a video, and for removing temporal noise.

Maximum Histogram Filter: In general, the MaximumHistogram filter acts somewhat like a median filter, but is more computationally expensive. It delivers the pixel in the corresponding span that is most like the other pixels in the span. More specifically, the MaximumHistogram filter returns the pixel with the minimum sum of squared distances in red, green, blue (RGB) color space to all other pixels in the span. This filter is also useful for removing objects found in only one or a few images.

Minimum Histogram Filter: The MinimumHistogram filter does just the opposite of the MaximumHistogram filter by returning the pixel furthest from all others. That is, the MinimumHistogram filter returns the pixel with the maximum sum of squared distances in RGB space to all others.

Maximum Luminance (Y) Filter: The MaximumLuminance filter, MaxY(x,y) filter simply returns the pixel in the span at (x,y) with the maximum luminance, Y. This filter is useful in providing an apparent lighting condition that is sparkling and bright, thereby showing details of an object such as a statue that would otherwise be not possible. Additionally, this filter is useful in providing a background in an image that is lit up instead of dark by combining one image taken with flash and one taken without flash but with a long exposure.

Maximum Contrast Filter: In general, the MaximumContrast filter, for each pixel along the span, checks how different each pixel is from its neighbors. This filter then delivers for each pixel the one in the span for which the local contrast is highest. This filter is useful for combining multiple lighting situations of the same object. By doing so, this filter gives the most detailed portion of a series of images. For instance, the MaximumContrast filter will show all of the details of the surfaces of mountain where the sun is at a glancing angle if the image stack is composed of images of the mountain taken over time in different lighting conditions and the max contrast filter is applied in creating a composite image of the mountain. More specifically, the MaximumContrast(x,y) filter returns the pixel in the span at (x,y) that has the highest contrast in a small (e.g., a 5×5 pixel) neighborhood around it. This filter was inspired by Koenderink and Pont's "Texture at the Terminator" [3]. This filter has proven useful when combining images under different light conditions or taken at multiple focal lengths.

Temporal Smooth/Sharpen Filter: The temporal smooth or blur filter blurs or smoothes some portion of the image stack, while the sharpen filter sharpens it. The TemporalSmooth/Sharpen(x,y,z,dz) filter returns, as its name implies, a low/high pass filtered version of the image stack where the lowpass filter operates in the z direction. Parameters for this filter include z and dz, the center and width of the filter along the span. In one embodiment of this filter a user sets the width dz of the portion of the image stack that is to be blurred or sharpened. The TemporalSharpen filter delivers the pixel in the current slice modified by the difference of the pixels in slices before and after the current slice. The effect can be lessened by lowering the transparency value. This filter is useful in highlighting motion or reducing motion blur. The TemporalSmooth filter delivers a weighted blend of the current slice and slices before and after the current one.

High Dynamic Range Filter: In general, the HighDynamicRange filter computes a high dynamic range radiance value for each pixel. The HighDynamicRange filter combines different exposures over the span, when the image stack consists of images taken at different exposure levels. Typically the exposure data is extracted from the metadata associated with each image in the image stack. Once the radiance image is delivered the user can modify the "tone mapping" from radiance to pixel values in a mapping window. More specifically, the HighDynamicRange(x,y,map(R→Y)) filter assumes the input stack has images with different exposures and exposure information. For example, in one embodiment, this exposure information is contained in the XIF portion of jpeg files. This filter computes a radiance value for each pixel [1] and then tone maps the radiance back to the gamut of the monitor (e.g., 0 to 255) via a user defined map (automatic tone mapping can also be used as in [2] [4]). The tone map can be adjusted in real time as the user observes the resulting intermediate image.

High Dynamic Range Y Filter: In general, the HighDynamicRangeY filter is the same as the High Dynamic Range filter, except that it only applies to the Y luminance component of the image. The red, green, and blue channels are then computed to match the luminance.

Surface Filter: The surface filter operates on the image stack defined by the x,y,z coordinates by extracting those pixels lying on a surface embedded in the stack. More specifically, the Surface(x,y,z(x,y)) filter returns the pixel I(x,y, z(x,y)) where z(x,y) defines a surface through the image stack volume. Two surface design tools have been implemented in one working embodiment of the invention. One surface design tool creates a planar slice by adjusting rotations about the x and y axes and translating in z. The other surface design tool produces a swept surface by defining a curve z(x) for all values of y. Each of these surface design tools can be defined interactively and the resulting intermediate image produced in real time. The surface filter is useful in the temporal blending of images over time. For instance, if the image stack contains images taken of a tree in the various seasons, a composite image can be composed wherein the left part of the tree is barren in the winter and has leaves in the fall on the right side, with the parts between showing the tree in the spring and the summer.

Depth Smooth: When pixels are transferred from the source to the final composite image, they retain the z values indicating at what depth in the image stack the pixel values were drawn from. The DepthSmooth filter operates on these z values in the composite image. It filters the z values, removing high frequency noise and then resamples the pixels from the stack based on those smoothed z values. This filter can be used to smooth a surface through the volume that was created by painting, or another filter such as Z-quantize. The visual effect will vary depending on the stack images.

In addition to the filters described above, one embodiment of the system and method according to the invention includes advanced filters that operate on intermediate images that were previously operated on by the above-described filters. One such filter is the Mat filter.

Mat Filter: The Mat filter has two source images as input, an intermediate image and a stack image. For example, the median intermediate image can be used as an input to the mat filter along with an original stack image. The median is compared to the stack source to produce a transparency mat to be associated with the intermediate image. The resulting mat image is a copy of the source color values, with the alpha channel (transparency) values determined by the difference of between the 2 source images. The alpha channel is used in painting operation when pixels from the source are composited into the final image. The painting is sometimes called an "over" operation as the paint from the source is layed over the composite. If the paint has a low or zero alpha, then the paint is transparent and has no effect. If the alpha value is high (near 1) then it is opaque and fully covers the existing portion of the composite. This allows the user to clip out a moving object from in front of a static background and paint it into the composite without erasing earlier work. More specifically, the Mat(C1(x,y), C2(x,y), α(|C1(x,y)−C2(x,y)|)) filter takes two images and a matting function as input and produces a mat of the first image, C1, by modifying its alpha channel. The Mat filter is particularly useful for adding specific temporal events to the final composite image without erasing earlier edits. The median image typically provides the comparison image, C2. In addition to the two images, C1 and C2, the mat filter requires a mapping from pixel differences to alpha. A simple approach to define the mapping from color differences to alpha is provided in the system and method according to the invention in which the user adjusts two parameters, an absolute difference threshold and a smoothing factor defining a smoothed step function.

Additionally, it should be noted that it is possible to create an image stack from a set of intermediate images and further filter them. The above-described filters only specify a subset of the filters that could be used with the image stack. Other filters can be created and plugged in for use with the image stack.

2.4 Application of Filters to Image Stack.

FIGS. 3-9 depict the application of one or more filters to image stacks made from sets of still and video images. Some represent "one button" results from a single filter, others combine filters and brushing. The composite images presented required between one and ten minutes of user interaction each.

Figure 3:
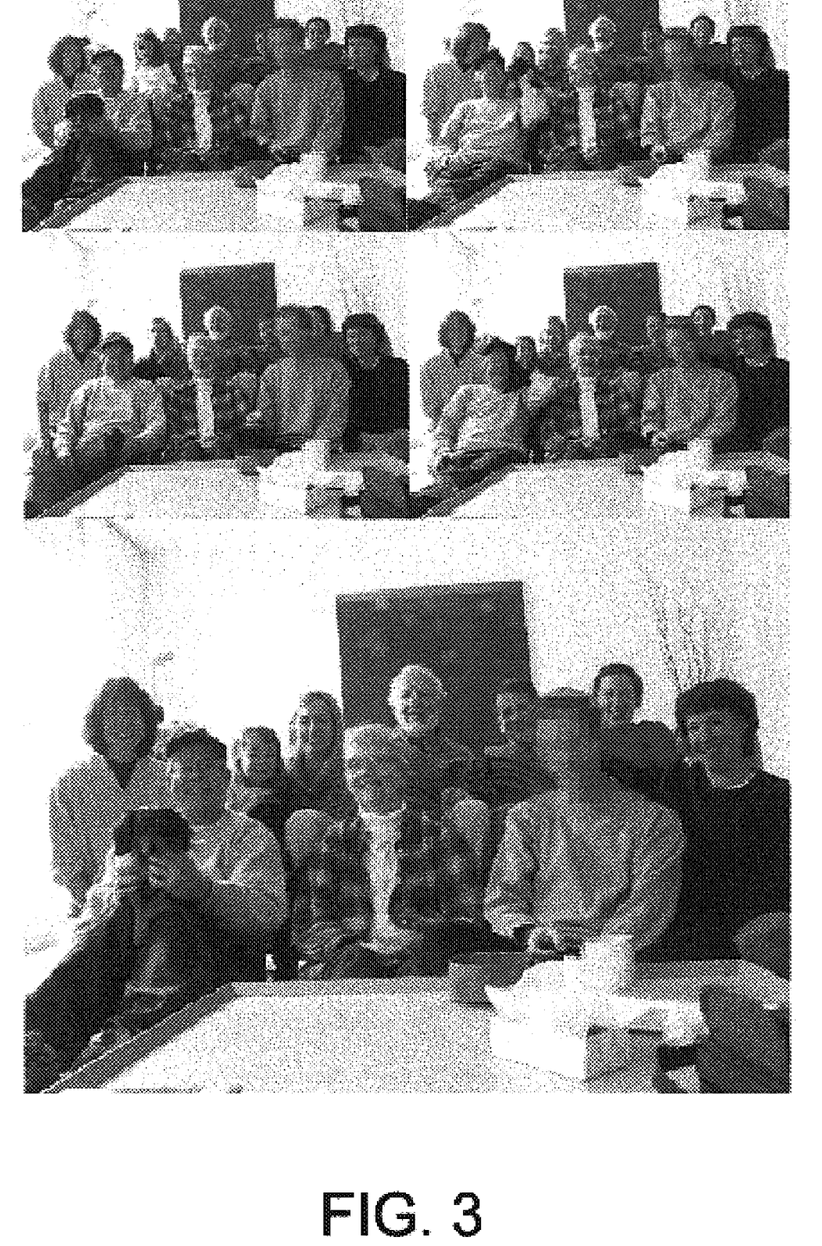
FIG. 3 depicts a series of still images of a family. The bottom image was created by selecting sections of the original images (shown above the bottom image) and painting those sections into a new composite image.

FIG. 3 depicts a series of still images of a family that were captured by a camera mounted to a tripod. Four of these still images are shown above. The bottom image was created by selecting sections of the original images and painting those sections into a new composite image. This composite image was created in about four minutes while the family looked over the author's shoulder.

Figure 4:
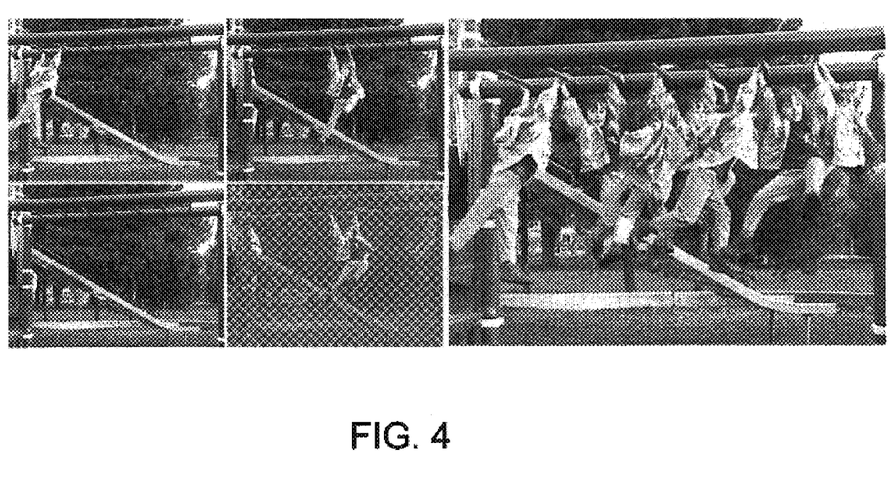
FIG. 4 depicts two video frames. The bottom left most image is the median of all images. The strobe-like composite on the right was created by using a brush to add mats (like the one shown at the bottom right) to the composite image.

The top two images of FIG. 4 depict two stills from a video. The bottom left most image is the median of all images. Note that although a child appears in all of the original images, the child is absent in the median. The bottom right image shows a depiction of the mat filter applied to the median and the upper right image. The checkerboard indicates the transparency of all but the child. The strobe-like composite on the right was created by using a brush to add mats (like the one shown at the bottom right) to the composite image. Each mat was created by comparing the individual frames to the median.

Figure 5:
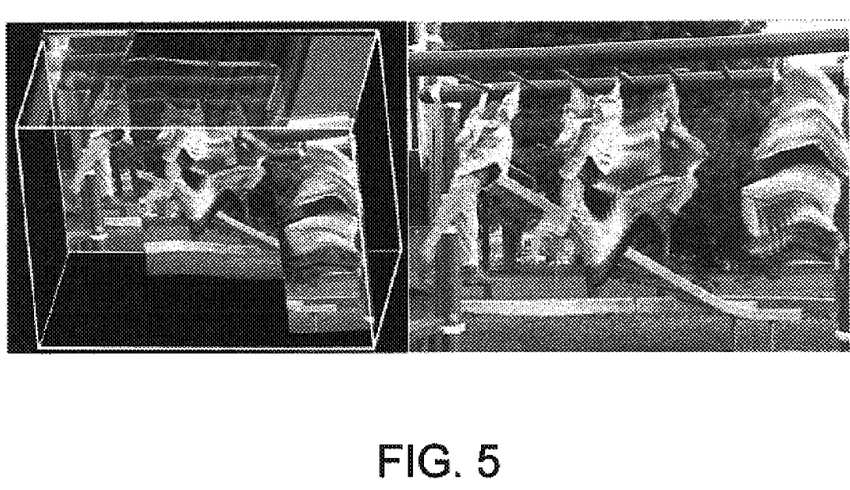
FIG. 5 depicts images from the same video used in FIG. 4 that were used to create a video cube shown left.

The same video used in FIG. 4 was used to create a video cube shown left in FIG. 5. In this figure, a user defined a function z(x) by interactively constructing a Hermite cubic curve. The user interface (UI) allowed the video cube to be tilted so the user could draw a curve on the top surface of the volume. The result at the right is the surface as seen head on.

Figure 6:
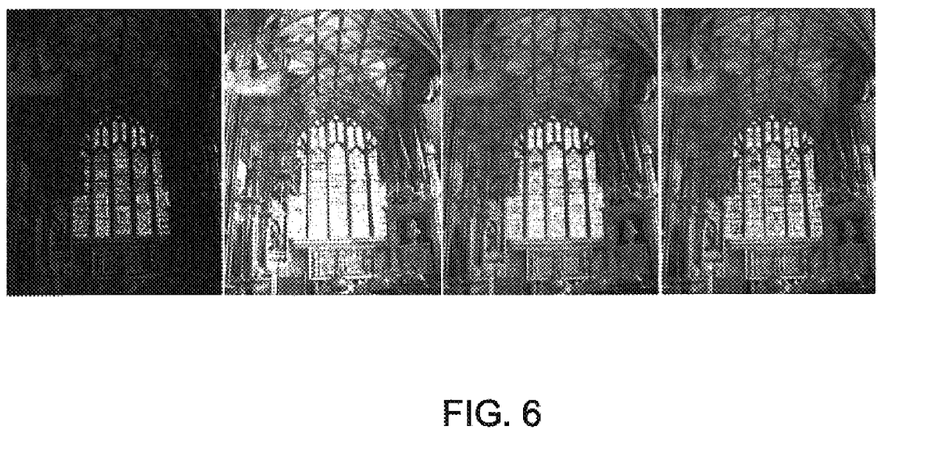
FIG. 6 depicts High Dynamic Range (HDR) imagery created from an image stack of stills taken at different exposure levels.

In FIG. 6, High Dynamic Range imagery was created from an image stack of stills taken at different exposures. Two of four input images are shown at left. A radiance image is first computed following Debevec et al [1]. The user created an initial tone mapping by defining a function from radiance to gamut luminance. A result of this tone mapping is shown in the third panel from the left. The brush tool was then used to paint lighter flags from the image in the second panel and darker stained glass from an intermediate exposure (not shown) onto the resultant image (fourth panel). The combination of automatic high dynamic range (HDR) methods and interactive tone mapping provides a power tool for combining multiple exposures.

Figure 7:
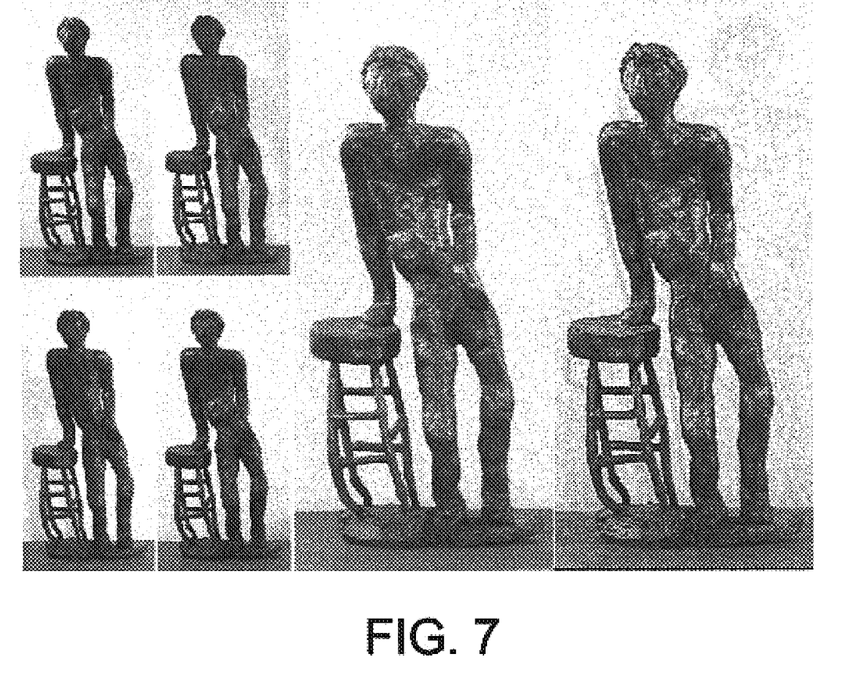
FIG. 7 depicts four images (of 15 images captured) that were taken while moving a desk lamp around a bronze sculpture. Each image enhances specific regions of the sculpture, but none provides adequate overall detail. The center panel is a one button result created by applying a MaxY filter to the image stack. In this image all of the highlights are included and the shadows have disappeared from the background.

Lighting a stationary object to bring out all of its detail is a difficult task requiring great skill. In FIG. 7, the four images (of 15 images captured) shown to the left were taken while moving a desk lamp around a bronze sculpture. Each image enhances specific regions but none provides adequate overall detail. The center panel is a one button result created by applying the MaxY filter to the image stack. In this image all of the highlights are included and the shadows have disappeared from the background. The right image depicts a one button result created by applying the MaxContrast filter to the image stack. The increased local contrast adds detail to the surface of the sculpture. Note that neither of these results could have been created using real world lighting configurations. The texture in the background of the second image can be easily "brushed out" by combining these two images.

Figure 8:
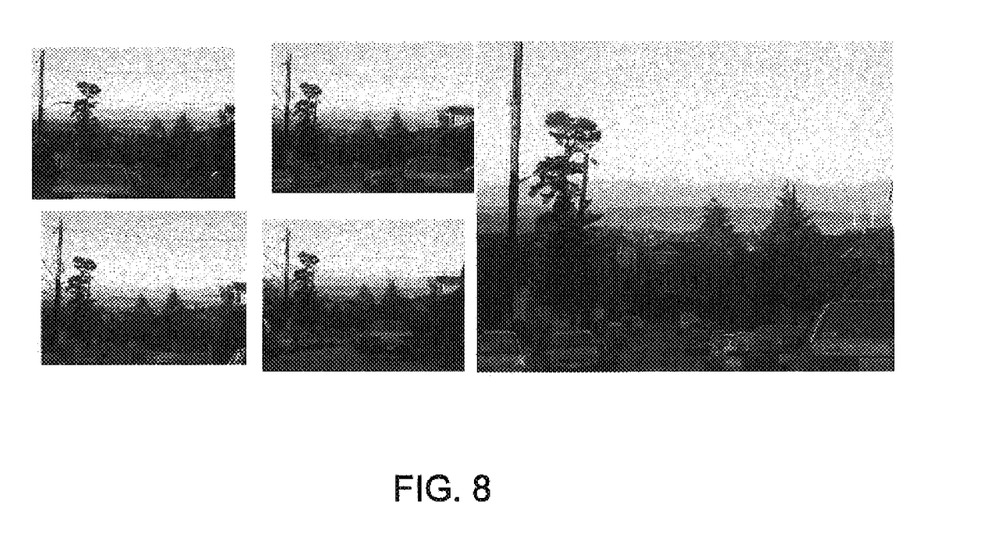
FIG. 8 depicts four images at the top that were captured by moving the camera to the left and right, and up and down a few feet. The images were then registered manually to align the background mountains. The right hand resulting composite was created by first invoking the MaxY filter which effectively removed all the wires shown in the original images, but also included multiple ghosted versions of the foreground. The upper right of the four small images was then selected to brush in the foreground.

In FIG. 8, the four images at the top were captured by moving the camera to the left and right, and up down a few feet. The images were then registered manually to align the background mountains. The right hand resulting composite was created by first invoking the MaxY filter which effectively removed all the wires but also included multiple ghosted versions of the foreground. The upper right of the four small images was then selected to brush in the foreground.

Figure 9:
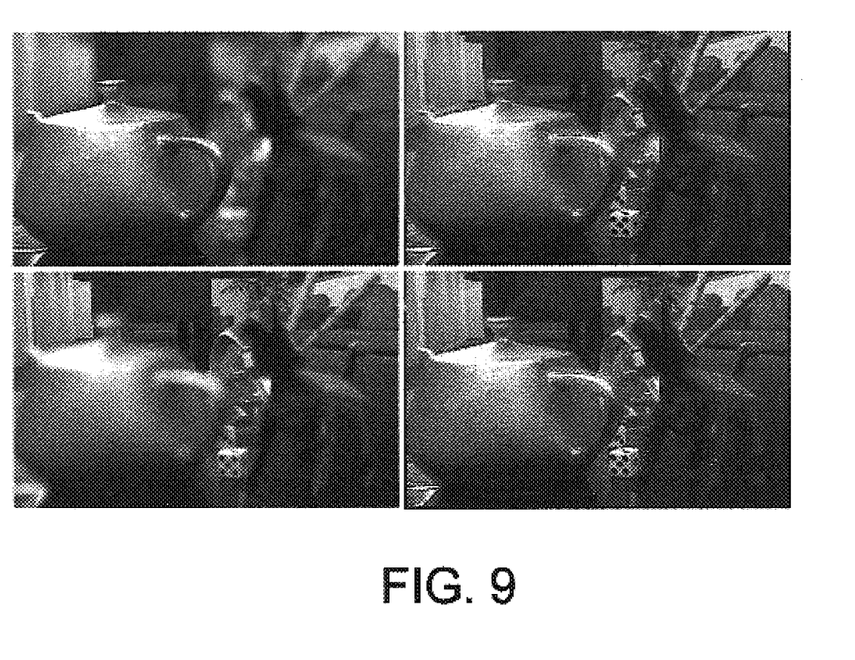
FIG. 9 depicts two images from a 120 frame video sequence in the left most panels. These two images were captured at different focal lengths. The upper right image is a one-button result created by applying the MaxContrast filter to the image stack. The MaxContrast filter successfully selected pixels in focus for most regions of the image. The fourth image was created by brushing texture from another image onto the MaxContrast result thereby removing artifacts in areas with low texture content such as the walls in back.

In FIG. 9, two images from a 120 frame video sequence are provided in the left most panels. These two images were captured at different focal lengths. The upper right image is a one-button result created by applying the MaxContrast filter to the image stack. The MaxContrast filter successfully selected pixels in focus for most regions of the image. The fourth image was created by brushing texture from another image onto the MaxContrast result thereby removing artifacts in areas with low texture content such as the walls in back.

3.0 Exemplary User Interface.

The user interface (UI) of one exemplary embodiment of the invention is designed to easily complete operations on the image stack.

3.0 Display and Menus.

Figure 10:
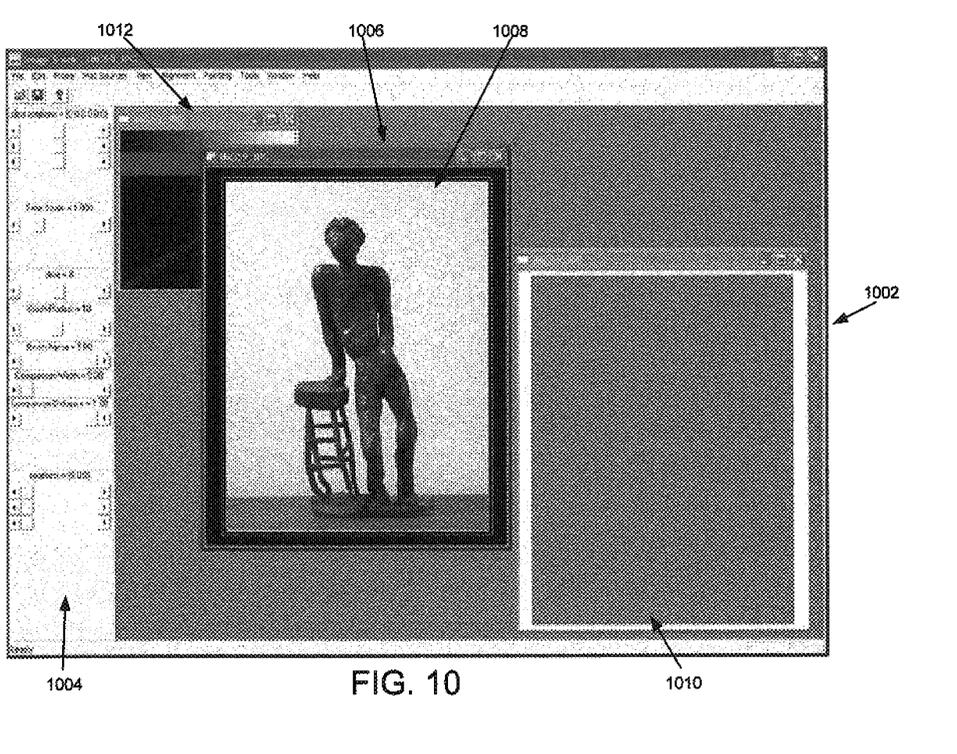
FIG. 10 depicts an exemplary User Interface (UI) of one working embodiment of the present invention.

One exemplary display of the UI 1002 of one working embodiment of the invention is shown in FIG. 10. This UI allows a user to set the parameters of the filters and the parameters of the brushes used to create the composite drawing. As shown in FIG. 10, this UI includes a set of sliders 1004 that allow a user to set the parameters necessary to select the manipulate the intermediate images to create the composite image. The display 1002 also includes a pane 1006 which displays the source image 1008 from the image stack, which is being used to create the composite image. Additionally, the composite image 1010 is displayed. A high dynamic range mapping window 1012, that is used in tone mapping for the high dynamic range filter, is also shown.

Figure 11:
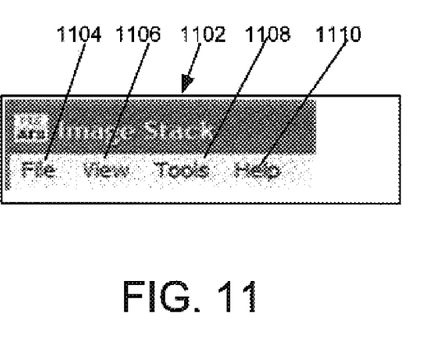
FIG. 11 depicts the opening menu of the exemplary UI shown in FIG. 10.

The opening panel of one exemplary user interface has a menu 1102 with only a few choices: and 1) a file menu option 1104; 2) a view menu option 1106; 3) a tools menu option 1108; and a 4) a help menu option 1110. The file menu 1104 allows a user to open one of two types of content—a short video file, or a set of image files. The tools menu 1108 has various options for manipulating video files and resizing images. Initially, the view menu 1106 has view options related to setting up the display such as configuring and displaying tool bars. The help menu 1110 provides the user with a User's Guide providing various helpful information related to the processing necessary to create the composite image and a software version designator.

Figure 12:
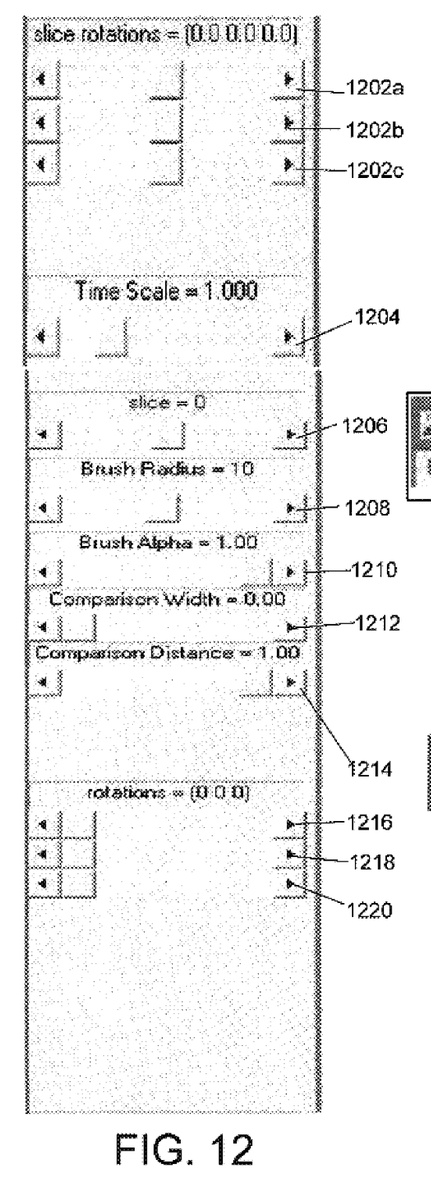
FIG. 12 depicts a portion of the exemplary UI shown in FIG. 10 wherein the sliders for setting parameters in creating a composite image are set.

On the left hand side of the application there is a set of sliders, as shown in FIG. 12. The first three sliders 1202a, 1202b, 1202c allow a user to rotate a virtual plane through the 3D image stack. They are ordered top to bottom as X-axis, Y-axis, Z-axis. For example, by rotating about the Y-axis the user will see pixels from a lower or higher Z slice on the left than on the right. This will let the user scale the Z dimension. The time scale slider 1204 modifies the how the time dimension is scaled when viewing the image stack from an oblique angle. The next slider, the slice slider 1206, lets a user to flip through which Z value (e.g., frame number, image in the stack) that the user wants. The next slider, the brush radius slider 1208, controls the radius of the brush used to move "paint" from the source to the composite. The brush alpha slider 1210 controls the transparency of the brush. These next two sliders, 1212, 1214, control parameters of the matting filter. The last three sliders, 1216, 1218, 1220, like the first three sliders, also rotate the XYZ volume of the image stack, but in this case they rotate the whole volume, not the slice.

Figure 13:
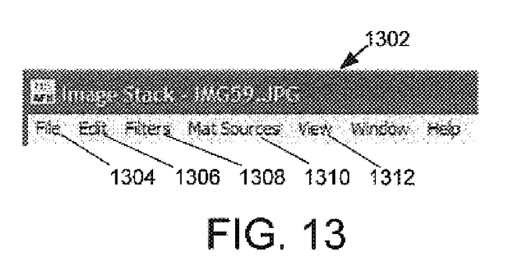
FIG. 13 depicts the menu choices of the exemplary UI shown in FIG. 10 once registered images have been selected in order to create a composite image.

Once the user has opened a video file or set of images, additional menu options are presented, as shown in FIG. 13. Additionally, the source image and composite image windows, as well as the high dynamic range mapping window, open in the application. These windows can be rearranged and/or resized at will. The menu bar at the top has an increased variety of pull down choices. The File menu option 1304 allows a user to open, close and save files. A Save composite option under the file menu option (not shown), saves the resulting composite image. The Save/Load Z-curve options (also not shown) are used to save the parameters of a particular filter. The Edit menu option 1306 provides a Copy Image to Composite option (not shown). This option copies what is seen in the source window to the composite window and combines it with what is there with an over operator based on the current value from the Brush Alpha slider. If the transparency, or alpha, is set to 1.0, then a direct copy will overwrite anything in the composite window. Otherwise the copy result is $$Result=alpha \times source+(1-alpha) \times composite$$

The Filters menu 1308 option provides means to create new images from combination of images on the image stack. Selecting a filter invokes that filter on the image stack. The filters options available in one exemplary embodiment of the invention include an image stack option that brings up the image stack itself for flipping through with the slice slider. Additionally, options are available to apply the Median, MayY, Max Histogram, High Dynamic Range, High Dynamic RangeY, Temporal Smooth, Temporal Sharpen, and Mat filters. Other matting sources can be selected under the MatSources 1310 pull down menu. The mat result is controlled by the Comparison Distance and Comparison Width sliders. The best way to use these are to invoke the Mat filter, then move the Comparison Distance from right to left until the portion of the image the user wants begins to appear. Then the Comparison Distance slider is moved from left to right to smooth the result. Other filters available are the Depth Smooth filter and the Z-surface filter. The View menu 1312 option provides various viewing options. A Play Movie menu option (not shown) flips through the slices like a movie. A Filter Textures menu option (not shown) creates a smoother result which slicing the stack by rotating a viewing plane. As for the Enable Alpha menu option (not shown) of the view menu, if the image stack source material has alpha information, or a filter modifies the alpha, this option allows the renderer to utilize alpha. Paint Mode and Z-Curve Mode menu options are also available and are mode switches. Paint mode is the normal mode. It is necessary to set Z-Curve mode to create a curved slice through the volume.

3.2 Brushes.

As mentioned previously, a composite image can be created by painting pixels from one or more source images into a new resultant image. A user may perform the painting operation by using a 2D brush to select which pixels in the source image are painted into the resultant composite image. While a huge variety of possible 2D brush shapes and alpha cross-sections are available in typical photo editing software, the image editing system and method of the invention focuses on 3D filtering operations which can be typically used in conjunction with the conventional 2D filters. Besides the typical 2D brushes in other photo editing applications, two types of brushes were used to create the composite images presented earlier. The first brush transfers all of the pixels from the source image to the composite image. The second brush is circular with a user-defined radius. When using either brush, the user can specify the brush's transparency (alpha) for compositing with an over operation.

A one-to-one correspondence between the source image and the composite image is set up, which in one embodiment of the invention allows a user to paint to the composite drawing even if the user is actually moving the brush on the composite image.

Additionally, it is possible for the user to scale the source and composite images. When the images are scaled, the brush is also scaled. In this case, however, the painting function still uses the highest resolution image available to perform the paint function.

In one embodiment of the invention, an automated face brush is employed. In this embodiment, the user enters a portion of the face, such as for example the eyes, and the system automatically calculates the size of the face to be transferred to the composite image.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Paul Debevec, Jitendra Malik, *Recovering High DynamicRange Radiance Maps from Photographs*, SIGGRAPH 1997.
[2] Frédo Durand and Julie Dorsey, *Fast Bilateral Filtering for the Display of High-Dynamic-Range Images*, SIGGRAPH 2002.
[3] Jan Koenderink and Sylvia Pont, *Texture at the Terminator*.
[4] Erik Reinhard, Michael Stark, Peter Shirley, James Ferwerda, *Photographic Tone Reproduction for Digital Images*, SIGGRAPH 2002.

Wherefore, what is claimed is:

1. A computer-implemented process for creating a composite image, comprising using a computer to perform the following process actions:
   inputting an image stack comprising a stack of non-layered, separate original images, each original image taken at a distinct separate time from the same point of view, wherein the pixel position of each original image in the image stack is defined in a three dimensional coordinate system, and wherein two dimensions describe the dimensions of each image in the image stack, and the third dimension describes the time an image was captured;
   applying one or more filters to the image stack to create one or more new 2D intermediate images;
   selecting one of the original images in the image stack or an intermediate image as a source image; and
   selecting pixels from the source image to be added to a composite image to create a final composite image, wherein a transfer of pixels from said source image to said composite image is based on a one-to-one correspondence regardless of whether pixel transfer is initiated from the source image or the composite image.

2. The process of claim 1 wherein the process action of inputting an image stack comprises inputting an image stack wherein said original images are defined in a Cartesian coordinate system.

3. The process of claim 1 wherein said process action of applying a filter comprises applying a slice filter wherein said filter returns an image in said image stack.

4. The process of claim 1 wherein said process action of applying a filter comprises applying a median filter that returns the median pixel luminance along a span of the image stack, wherein a span is a set of image pixels at the same location in all images of the image stack.

5. The process of claim 1 wherein said process action of applying a filter comprises applying a maximum histogram filter that returns the pixel with the minimum sum of squared distances in red, green, blue color space to all other pixels along a span of the image stack, wherein a span is the set of image pixels at the same location in all images of the image stack.

6. The process of claim 1 wherein said process action of applying a filter comprises applying a minimum histogram filter that returns the pixel with the maximum sum of squared distances in red, green, blue color space to all other pixels along a span of the image stack, wherein a span is the set of image pixels at the same location in all images of the image stack.

7. The process of claim 1 wherein said process action of applying a filter comprising applying a maximum luminance filter that returns the pixel with the maximum luminance along a span of the image stack, wherein a span is the set of image pixels at the same location in all images of the image stack.

8. The process of claim 1 wherein said process action of applying a filter comprises applying a maximum contrast filter that returns the pixel that has the highest contrast in a small neighborhood around it along a span of the image stack, wherein a span is the set of image pixels at the same location in all images of the image stack.

9. The process of claim 8 wherein said small neighborhood is 5 by 5 pixels.

10. The process of claim 1 wherein said process action of applying a filter comprises applying a temporal smoothing filter that returns a weighted blend of a current image and the images before and after it, for a given span of the image stack, wherein a span is the set of image pixels at the same location in all images of the image stack.

11. The process of claim 1 wherein said process action of applying a filter comprises applying a temporal sharpening filter that returns a pixel in the current image modified by the difference of the pixels in the images before and after the current image for a given span of the image stack, wherein a span is the set of image pixels at the same location in all images of the image stack.

12. The process of claim 1 wherein said process action of applying a filter comprises applying a high dynamic range filter that combines different exposures over a span of the image stack, wherein a span is the set of image pixels at the same location in all images of the image stack.

13. The process of claim 12 wherein the high dynamic range filter extracts exposure information associated with the original images that comprise the image stack.

14. The process of claim 1 wherein said process action of applying a filter comprises applying a surface filter that operates on a given surface through the image stack.

15. The process of claim 1 wherein said process action of applying a filter comprises applying a mat filter that produces a mat of a given portion of the image stack, wherein the mat is an image of transparency values that will modify the source image when it is used for creating said composite image.

16. A system for compositing digital images, the system comprising:
    a general purpose computing device; and
    a computer program comprising program modules executable by the computing device, wherein the computing device is directed by the program modules of the computer program to,
        input an image stack comprising a stack of original non-layered, separate images, each original image captured at a distinct separate time from the same point of view, wherein the pixel position of each original image in the image stack is defined in an x, y, z coordinate system, where x and y define the width and height of each image in the image stack and z defines an image taken in time;
        apply one or more filters to the image stack to create one or more new 2D intermediate images;
        select at least one original image or at least one intermediate image to serve as a source image; and
        select pixels from the source image to be added to a composite image to create a final composite image, wherein a transfer of pixels from said source image to said composite image is based on a one-to-one correspondence regardless of whether transfer is initiated from the source image or the composite image.

17. The system of claim 16 wherein said module to apply a filter applies a slice (x,y) filter wherein for each (x, y) said filter returns a pixel at depth z from said image stack.

18. The system of claim 16 wherein said module to apply a filter applies a high dynamic range luminance filter that comprises sub-modules to:
    compute a radiance value for each pixel in said image stack;
    map the radiance value for each pixel to its luminance value by mapping red, green and blue channels to a display to match the luminance.

19. The system of claim 16 wherein said module to apply a filter applies a median filter that returns an image I(x,y,z) where z is the depth with the median pixel luminance along a span of the image stack, wherein a span is the set of image pixels at the same location in all images of the image stack.

20. The system of claim 16 wherein said module to apply a filter applies a maximum luminance filter that returns the pixel in a span at (x, y) with the maximum luminance, wherein a span is the set of image pixels at the same location in all images of the image stack.

21. The system of claim 16 wherein said module to apply a filter applies a maximum contrast filter that returns the pixel in the span at (x,y) that has highest contrast in a small neighborhood around it, wherein a span is the set of image pixels at the same location in all images of the image stack.

22. The system of claim 16 wherein said module to apply a filter applies a high dynamic range filter that comprises sub-modules to:
    compute a radiance value for each pixel in said image stack;
    map the radiance values for each pixel back to a set of display values via a tone-map.

23. The system of claim 22 wherein said tone-map is user-defined.

24. The system of claim 16 wherein said module to apply a filter applies a mat filter that produces a mat of a given portion of the image stack, wherein the mat is an image of transparency values that will modify the source image when it is used for painting pixels to said composite image.

25. The system of claim 24 wherein said module that applies a mat filter comprises sub-modules for:
inputting a first and a second image;
inputting a matting function; and
producing a mat of the first image with its transparency modified.

26. The system of claim 16 wherein said module to apply a filter applies a surface filter that extracts pixels laying on a surface embedded in the image stack.

27. The system of claim 26 wherein said surface embedded in the image stack is user-defined.

28. A physical computer-readable storage medium having computer-executable instructions stored thereon for editing an image, said computer executable instructions operable to:
input an image stack comprising a stack of separate, non-layered images taken at distinct times from the same point of view, wherein the pixel position of each in the image stack is defined in a three dimensional coordinate system, wherein one dimension is time;
apply a filter to the image stack to create one or more new 2D intermediate images;
select one of the images in the image stack or an intermediate image to serve as a source image for creating a new composite image; and
select pixels from the source image to be added to a composite image to create a final composite image, wherein a transfer of pixels from said source image to said composite image is based on a one-to-one correspondence regardless of whether pixel transfer is initiated from the source image or the composite image.

29. A graphical user interface displayed on a display device for creating a composite image, comprising:
a source image window for displaying a source image derived from an image stack comprised of a stack of separate, non-layered original images, each separate non-layered image being taken at a distinct time and from the same point of view, wherein the pixel position of each original image in the image stack is defined in a three dimensional coordinate system, and wherein two dimensions of the three dimensional coordinate system describe the dimensions of each image in the image stack, and the third dimension describes a time a different image was captured, and wherein one or more 2D intermediate images are created by applying one or more filters to the image stack, said one or more 2D intermediate images being used as a source image; and
a composite image window wherein a composite image is displayed that is composed of parts of said source image that are transferred from the source image to the composite image by a user, wherein said transfer of pixels from said source image to said composite image is based on a one-to-one correspondence regardless of whether the user initiates pixel transfer from the source image or the composite image.

30. The graphical user interface of claim 29 wherein parts of said source image are transferred to said composite image by transferring pixels from the source image to the composite image.

31. The graphical user interface of claim 29 further comprising a paint brush function that transfers some pixels from said source image to said composite image.

32. The graphical user interface of claim 31 wherein a radius of pixel transfer is user-defined.

33. The graphical user interface of claim 29 further comprising a paint brush function that transfers all pixels from said source image to said composite image.

34. The graphical user interface of claim 31 wherein scaling the source image or the composite image scales paint brush function.

35. The graphical user interface of claim 34 wherein a highest resolution image available is used when transferring pixels using the paint brush function even when the source image or composite image are scaled.

36. The graphical user interface of claim 29 further comprising a paint brush function that transfers all pixels associated with a face from said source image to said composite image when said paint brush function is used to select a portion of said face.

* * * * *